United States Patent
Seshasai (10) Patent No.: US 9,454,669 B2
(45) Date of Patent: Sep. 27, 2016

(54) DYNAMICALLY LINKED CONTENT CREATION IN A SECURE PROCESSING ENVIRONMENT

(75) Inventor: Satwiksai Seshasai, Arlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1987 days.

(21) Appl. No.: 11/456,222

(22) Filed: Jul. 10, 2006

(65) Prior Publication Data

US 2008/0010205 A1    Jan. 10, 2008

(51) Int. Cl.
*G06F 21/00* (2013.01)
*G06F 21/62* (2013.01)
*G06Q 10/10* (2012.01)

(52) U.S. Cl.
CPC ........... *G06F 21/6218* (2013.01); *G06Q 10/10* (2013.01); *G06F 2221/2141* (2013.01)

(58) Field of Classification Search
USPC ............ 705/51, 16, 21, 59, 71; 380/44, 262, 380/278, 279
See application file for complete search history.

(56) References Cited

U.S. PATENT DOCUMENTS

| | | | |
|---|---|---|---|
| 5,132,900 A * | 7/1992 | Gilchrist et al. | |
| 5,963,205 A * | 10/1999 | Sotomayor | G06F 17/2235 707/E17.013 |
| 6,687,878 B1 * | 2/2004 | Eintracht et al. | 715/201 |
| 6,996,609 B2 * | 2/2006 | Hickman et al. | 709/218 |
| 7,356,762 B2 * | 4/2008 | van Driel | 715/206 |
| 2001/0027472 A1 * | 10/2001 | Guan | 709/203 |
| 2004/0054893 A1 * | 3/2004 | Ellis | 713/165 |
| 2005/0091346 A1 * | 4/2005 | Krishnaswami | G06F 9/44505 709/220 |
| 2005/0246283 A1 | 11/2005 | Gwiazda et al. | |
| 2006/0053380 A1 | 3/2006 | Spataro et al. | |
| 2006/0095961 A1 * | 5/2006 | Govindarajan | H04L 63/1416 726/15 |
| 2006/0179035 A1 * | 8/2006 | Broker | 707/3 |
| 2006/0235984 A1 * | 10/2006 | Kraus et al. | 709/228 |
| 2008/0005284 A1 * | 1/2008 | Ungar et al. | 709/219 |
| 2008/0059451 A1 * | 3/2008 | Musgrove | 707/5 |
| 2008/0082640 A1 * | 4/2008 | Chang et al. | 709/220 |

FOREIGN PATENT DOCUMENTS

WO    2006/020758 A2    2/2006

OTHER PUBLICATIONS

HTML & XHTML, The Definitive Guide, Fourth Edition, Chuck Muscino and Bill Kennedy; ISBN 0-596-00026-X (2000). ("HTML").*
The Wiki Way quick Collaboration on the Web, Bo Leuf and Ward Cunningham, ISBN 020171499X, (2001) ("Wiki").*

* cited by examiner

*Primary Examiner* — Dante Ravetti
(74) *Attorney, Agent, or Firm* — Cuenot, Forsythe & Kim, LLC (57) ABSTRACT

A method of creating content within a secure processing environment can include detecting a wiki identifier, indicating a phrase, within a parent document. The parent document can be associated with an author attribute. The method also can include searching for documents corresponding to the author attribute and that have a name corresponding to the phrase indicated by the wiki identifier. If one or more of documents are identified, a source anchor within the parent document can be created and a universal resource locator for the identified document can be associated with the source anchor.

17 Claims, 4 Drawing Sheets

DYNAMICALLY LINKED CONTENT CREATION IN A SECURE PROCESSING ENVIRONMENT

BACKGROUND

1. Field of the Invention

The present invention relates to content creation and, more particularly, to creating content within a secure processing environment according to a wiki content creation model.

2. Description of the Related Art

The term "wiki" refers to collaborative software that allows users to add content to a data collection and further permits users to edit that content. Wiki applications commonly are implemented as Websites accessible via the World Wide Web. The term "wiki" also is used to refer to the data collection managed by the wiki application. While creating or editing an electronic document, wiki functionality allows a user to utilize markup language to establish links to existing content within the same wiki.

An author invokes wiki functionality by utilizing a specialized tag within the electronic document being authored. The specialized tag identifies a phrase within the electronic document. The wiki application detects the tagged phrase and searches for another electronic document within the same wiki that has a name matching the tagged phrase. If found, the tagged phrase within the electronic document is turned into a hyperlink to the electronic document having the same name as the tagged phrase.

In the event that no electronic document having a name matching the tagged phrase is found within the wiki, the wiki application creates a blank electronic document called a stub. The stub is created with a name corresponding to the tagged phrase. The stub, serves as a place holder into which future user-contributed content can be added by the author or another contributor to the wiki.

One example of a Wiki is an online encyclopedia, implemented as a publicly available Website, through which users can contribute and view content. While a conventional wiki does amass a significant volume of quality data, such implementations lack the safeguards necessary for using the technology within a secure, or protected, processing environment. For example, within a company intranet or a team project site, different security mechanisms or safeguards are needed to prevent unauthorized access by users to selected data items. These features are lacking from conventional wiki implementations.

It would be beneficial to provide wiki functionality within a secure processing environment in a manner that addresses the limitations described above.

SUMMARY OF THE INVENTION

The present invention relates to content creation within a secure processing environment using a wiki data creation model. One embodiment of the present invention can include a method of creating content within a secure processing environment. The method can include detecting a wiki identifier, indicating a phrase, within a parent document. The parent document can be associated with an author attribute. The method also can include searching for documents corresponding to the author attribute and that have a name corresponding to the phrase indicated by the wiki identifier. If one or more documents are identified, a source anchor within the parent document can be created and a universal resource locator for the identified document can be associated with the source anchor.

Another embodiment of the present invention can include a method of creating content within a secure processing environment. The method can include detecting a wiki identifier within a parent document, wherein the parent document is associated with an author attribute, and identifying a set of documents corresponding to the author attribute. The method also can include searching the set of documents for documents having a name corresponding to a phrase indicated by the wiki identifier within the parent document and, responsive to a user selection of at least one document located by the search, creating a source anchor within the parent document and associating a universal resource locator for the selected document with the source anchor. Responsive to a user rejection of documents located by the search, or if no documents are located by the search, the method can include creating a stub having a name determined from the phrase, associating the stub with an access control list, and creating a source anchor within the parent document and associating a universal resource locator for the stub with the source anchor.

Yet another embodiment of the present invention can include a machine readable storage being programmed to cause a machine to perform the various steps and/or functions described herein.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to a wiki-type content creation system for use within a secure processing environment. As noted, the term "wiki" refers to a volume of information that users may access and to which users may contribute. In accordance with the inventive arrangements disclosed herein, a wiki content creation system is provided which accommodates varying user rights and privileges with respect to content creation and access to the various documents within the wiki. The term "document" can include, but is not limited to, an electronic document such as a markup language document, a text document, a word processing document, a spread sheet, audio, video, an image, audiovisual material, and/or the like. Accordingly, a document can be formatted or encoded in any of a variety of different file formats. The terms "document" and "content" are used interchangeably throughout this specification.

FIGS. 1A-1D are flowcharts that, taken collectively, illustrate a method of creating content within a secure processing environment in accordance with the embodiments disclosed herein. The method illustrated in FIGS. 1A-1D can begin in a state in which a wiki content creation system is available within a secure processing environment. The embodiments disclosed herein can be used in a multi-user collaboration environment where each user, or author, is associated with a given set of rights. The secure processing environment can be provided on the Internet, the World Wide Web, or within an intranet, as the case may be. Availability of documents within the wiki can be controlled on a per document and/or per user basis. Each user that is permitted to access the wiki can be associated with a particular set of access rights governing the ability of that user to access and create documents within the wiki.

Figure 1A:
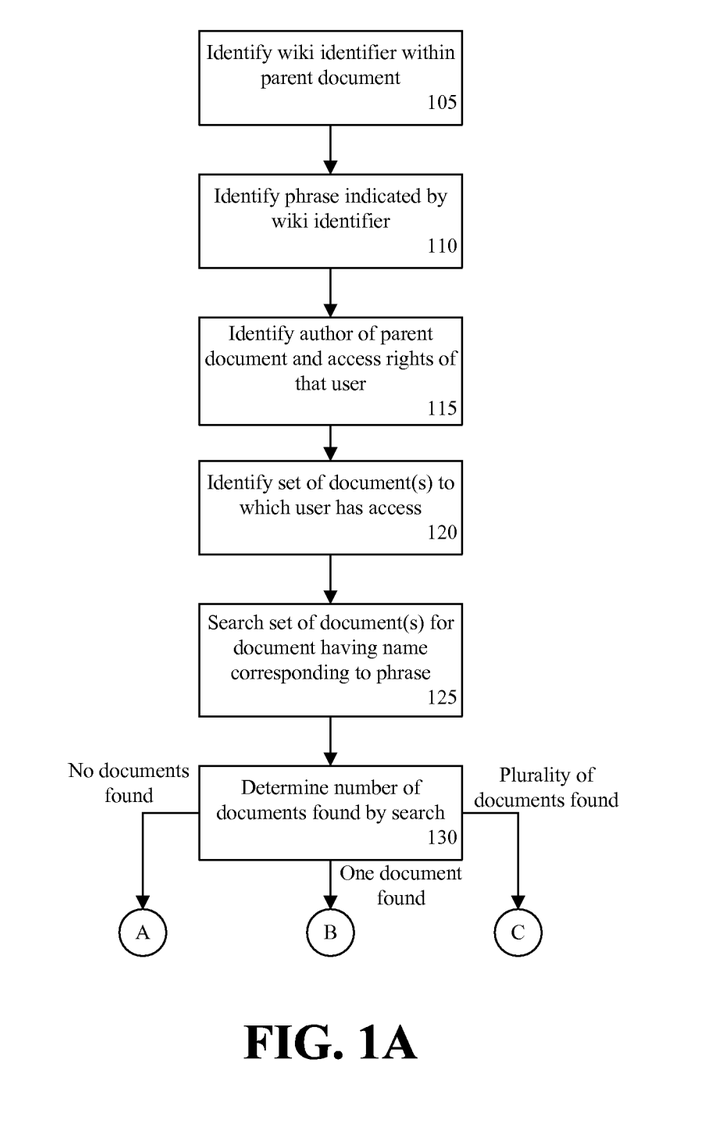
FIGS. 1A-1D are flow charts that, taken collectively, illustrate a method of creating content within a secure processing environment in accordance with the embodiments disclosed herein.

The method can begin in a state where a user is authoring a document to be added to the wiki. In step 105, a wiki identifier can be located within the document being created by the user, referred to as the parent document. The wiki content creation system can search the document for a wiki identifier. The wiki identifier can be a tag or other predetermined indicator, which when detected within the parent document by the wiki content creation system, causes a document or stub to be linked or otherwise associated with the phrase indicated, or set off, by the wiki identifier. For example, the wiki identifier can be a set of brackets "[ ]", a set of tags such as "<wiki></wiki>", or the like. It should be appreciated that the particular type of wiki identifier is not intended to limit the present invention in any way and that any of a variety of different mechanisms for marking a phrase can be used, i.e. bolding the phrase, highlighting the phrase, etc.

In one embodiment, the parent document can be searched for one or more wiki identifiers after the parent document has been completed or submitted to the wiki content creation system for inclusion within the wiki. More particularly, when the user is finished creating or editing the parent document, the parent document can be processed and searched. In another embodiment, the searching can be performed dynamically as the user creates or edits the parent document. In that case, shortly or immediately after creating the wiki identifier within the parent document, the wiki-identifier can be automatically detected. In such an embodiment, the author can create the parent document using an editor provided by the wiki content creation system, for example, or one that is intended to work cooperatively with such a system.

In step 110, a phrase indicated by the wiki identifier can be identified. For example, if the wiki identifier is a set of brackets, the phrase indicated by the wiki identifier can be a portion of text within the brackets, i.e. [phrase]. If the wiki identifier is a set of tags, the phrase can be located between the tags, i.e. <wiki>phrase<wiki>. As used herein, a phrase can include any letter, number, symbol, including spaces, or any combination thereof, that is contained within the wiki identifier or is otherwise distinguished from other portions of the parent document by the wiki identifier. This allows the author to specify the phrase as any set of symbols that the author wishes to serve as the hyperlink to the content to be referenced by that phrase.

In step 115, the user that is the author of the parent document can be identified. As the embodiments disclosed herein can be used within a secure processing environment, some form of user tracking can be employed to associate the user with the parent document, i.e. a login process, or other suitable user identification means. As such, it should be appreciated that the identification of the author of the parent document need not be performed in the order illustrated in FIG. 1A. For example, if a login system is implemented, the user that is the author of the parent document will already be known. In any case, the user can be associated with a particular set of access rights that determine which documents within the wiki that user may access. Accordingly, in step 120, the set of documents that the user may access, as determined according to the access rights of that user, can be identified.

In one embodiment, the parent document can be associated with an author attribute. The author attribute can indicate the class of the user that created the parent document substantially as described herein. That is, the author attribute can indicate the rights and privileges attached to the parent document, which are the rights and privileges of the user that created the parent document. The author attribute, however, also can indicate, or take on a value indicating, "anonymous". In that case, the author of the parent document, as well as the class of the author, is unknown. An author attribute indicating "anonymous" makes the parent document available to all classes of users of the wiki.

In step 125, the set of documents can be searched for one or more documents having a name that corresponds to, or is the same as, the phrase indicated by the wiki identifier. It should be appreciated that although described has a multi-step process, i.e. identifying the set of documents corresponding to the user and then searching according to the phrase, the search can be performed in a more unified manner. For example, in another embodiment, the phrase and the author identity, or rights, can be provided as parameters to a searching algorithm or module such that one search is performed rather than a multi-step process.

In any case, in one embodiment, the name of each document, corresponding to the actual filename of the documents, can be compared with the phrase indicated by the wiki identifier. In another embodiment, a document management system can be provided that is capable of creating documents and storing each document using a unique filename. Such documents still can be associated with a name parameter to which users can ascribe an intuitive, user-specified name. In that case, the name attribute can be searched to identify one or more documents having a name attribute that matches the phrase indicated by the wiki identifier.

In step 130, the number of documents found by the search can be determined. If no documents are located, the method can proceed to step 205 of FIG. 1B. If a single document is located, the method can proceed to step 305 of FIG. 1C. If more than one document is located, the method can proceed to step 405 of FIG. 1D.

Figure 1B:
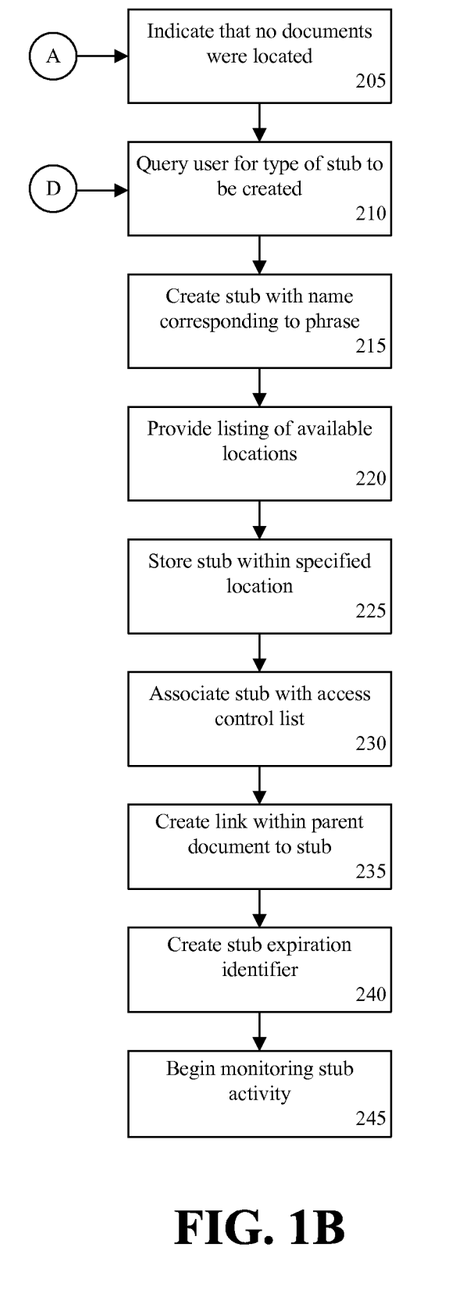

FIG. 1B is a flow chart illustrating a method of stub creation in accordance with another embodiment of the present invention. Continuing with step 205 of FIG. 1B, in the case where no documents were located by the search, the user can be provided with an indication that no documents were located. In step 210, the user can be queried as to the particular type of stub that is to be created. In one embodiment, the wiki content creation system can include a plurality of different stub types, each corresponding to a different data schema. In this manner, different stub types can include different types and/or arrangements of data fields which may correspond to different tasks within a collaborative environment.

In step 215, a stub having a name, or name parameter as the case may be, corresponding to, or matching, the phrase indicated by the wiki identifier can be created. A stub can refer to a generic markup language document that includes the code necessary for being rendered by a browser, but otherwise includes no user-contributed content. In that sense, a stub is a type of document, albeit one with no user-contributed content or one with insufficient user-contributed content. In one embodiment, for example, documents within the wiki can include an attribute designating whether the document is a stub. Once the stub receives user-contributed content, the stub attribute can be changed or otherwise removed. Such process may be manual in nature or can be automatic, i.e. the wiki content creation system detects a modification to the stub by a user, thereby causing the stub attribute to be dropped.

In step 220, a list of available locations to which the stub can be stored can be presented to the user. The locations specified in the list can be limited to only those locations within the wiki file structure that the user is permitted to access or store documents. If the author attribute of the parent document indicates unknown, then the list of locations can be only those locations available for storing documents having an anonymous author attribute, for example. The list of locations can specify folders, rooms, or any other mechanism for specifying a location within the wiki file structure. In step 225, the stub can be stored within the location specified by the user, i.e. responsive to a received user input. In one embodiment, the document stub automatically can be stored within the same location within the file structure of the wiki in which the parent document is located.

In step 230, the stub can be associated with an access control list. The access control list can specify which users, or classes of users, can access the stub, convert the stub to a document, and/or thereafter contribute content to the document. In one embodiment, the access control list can be the same as the access control list corresponding to the parent document. That is, the stub can inherit the same security settings or traits as the parent document. In another embodiment, the author of the parent document can specify a particular set of rights, or access control list, which can vary from the access control list of the parent document. In any case, the association of an access control list to a stub provides for document level security.

In step 235, a link from the phrase indicated by the wiki identifier in the parent document to the stub can be created. The link can be formed of two endpoints, or anchors. The link can begin at the source anchor and end at the destination anchor, which can be any item of content within the wiki, i.e. a document or stub. In one embodiment, the wiki identifier and the phrase indicated by the wiki identifier within the parent document can be replaced with a source anchor. The source anchor, i.e. the hyperlink, can be the phrase indicated by the wiki identifier. The destination anchor, referred to as the destination anchor document, is the stub.

In step 240, a stub expiration identifier can be created and stored within a stub expiration data store, whether a database or other organization of data. The stub expiration identifier can identify the stub created in step 215, for example, by including the universal resource locator (URL) of the stub.

In addition, the stub expiration identifier can include a time stamp specifying the date and/or time in which the indicated stub was created. In step 245, the wiki content creation system can begin monitoring stub activity. The wiki content creation system can monitor for the expiration of stubs, to be described herein in further detail, as well as the conversion of a stub into a document having user-specified content. After step 245, the method can repeat as may be required.

Figure 1C:
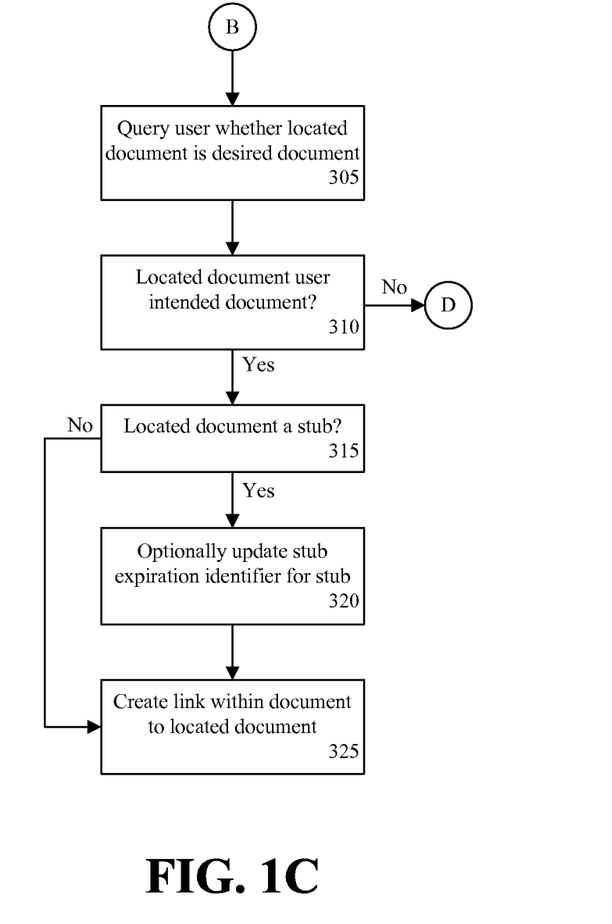

FIG. 1C is a flow chart illustrating a method of linking the parent document with a source destination document in accordance with another embodiment of the present invention. If one document is located in step 130 of FIG. 1A, the method can proceed to step 305 of FIG. 1C. Because the search retrieves only documents that the author is permitted to access, document level security is maintained.

In step 305, the user can be queried as to whether the document located by the search is the user intended, or desired, document. In one embodiment, the user can be provided with a preview of the located document or one or more excerpts of the document. In another embodiment, one or more attributes of the document can be presented such as the location of the document within the wiki data structure, the folder in which the document is located, the author of the document, whether the document is a stub, or any other attribute that may aid the user in determining whether the located document is the desired document to be linked with the parent document.

In step 310, if the located document is not the user desired document, the method can proceed to step 210 of FIG. 1B where the stub creation process can be started since the located document is not the user desired document. If the located document is the user intended document, the method can proceed to step 315. In one embodiment, the search performed as described with reference to step 125 can include a search of stubs as well as documents having user-contributed content. Accordingly, in step 315, a determination can be made as to whether the located document is a stub.

If the located document is a stub, in step 320 the information specified by the stub expiration identifier optionally can be updated to extend the life of the stub in accordance with this latest reference to the stub in the wiki. In step 325, a link to the located document, whether a document or a stub, from the parent document can be created. As noted, the wiki identifier and the phrase indicated by the wiki identifier within the parent document can be replaced with a source anchor. The source anchor can be associated with the URL identifying the located document, also referred to as the destination anchor or the destination anchor document.

In another embodiment, the wiki content creation system need not query the user as to whether the located document is the user desired document. In that case, steps 305 and 310 can be optional in nature. Accordingly, from step 130, the method can proceed to step 315 with the assumption that the located document is the correct document. Accordingly, the link to the located document within the parent document can be created automatically without further user intervention or confirmation that the located document is the correct document.

Figure 1D:
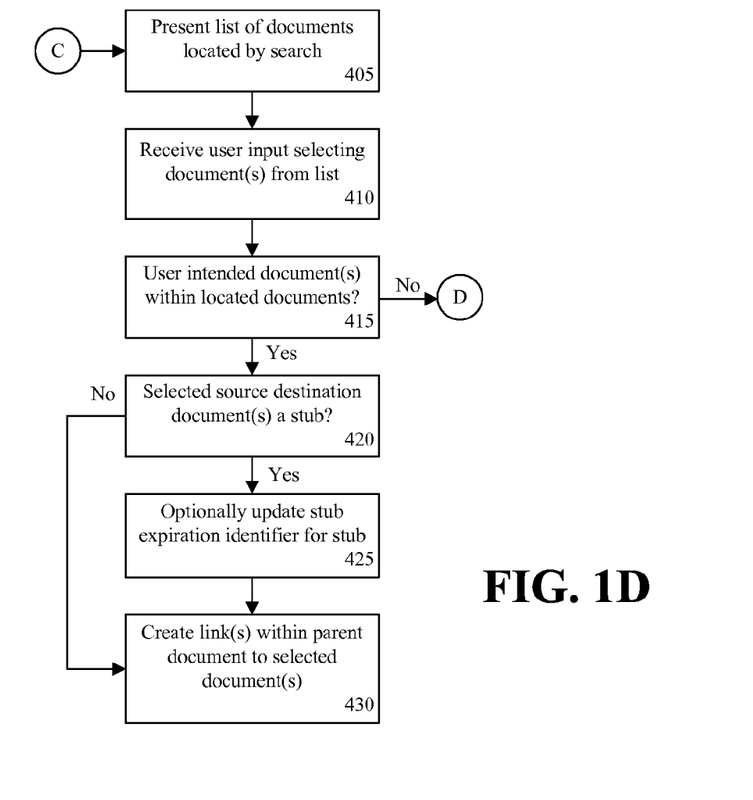

FIG. 1D is a flow chart illustrating a method of linking the parent document with a plurality of source destination documents in accordance with another embodiment of the present invention. If it is determined that more than one document was located in step 130, the method can proceed to step 405 of FIG. 1D. In step 405, a list of the located documents can be presented to the user. The list of located documents, including any located stubs, can be sorted according to any of a variety of different sorting algorithms. In one embodiment, for example, a nearest neighbor sorting algorithm can be used to determine the order of the documents on the list. It should be appreciated, however, that different sorting algorithms can be used and that the present invention is not intended to be limited by the particular sorting algorithm used.

In another embodiment, the list of documents can be augmented with supplemental information as described with reference to FIG. 1C that may aid the user in determining which documents are the desired documents. Such information can be presented automatically as part of the list or can be selected responsive to a further user input, i.e. a user highlighting or temporarily selecting an item on the list.

In step 410, a user input specifying selected ones of the located documents can be received. As noted, along with the documents, various document attributes can be specified which can aid the user in selecting those documents, or the particular document, that will be linked with the parent document. In step 415, a determination can be made as to whether any of the documents of the list were selected. If the user did not select any documents, or otherwise indicated that none of the located documents is or are the user intended document, the method can proceed to step 210 where the stub creation process can be initiated.

In step 420, a determination can be made as to whether any of the selected document(s) is a stub. If so, the method can continue to step 425. If not, the method can proceed to step 430. In step 425, if one or more of the located documents is a stub, the information specified by the stub expiration identifier for each stub, optionally, can be updated to extend the life of each stub in accordance with this latest reference to each respective stub.

In step 430, a link within the parent document can be created to each document that was selected by the user from the list of documents. In one embodiment, where a single document is selected by the user, a link from the parent document can be created to the selected document. As discussed, the wiki identifier and the phrase indicated by the wiki identifier within the parent document can be replaced with a source anchor, the phrase in hyperlink form. The URL corresponding to the selected document can be associated with the source anchor. The selected document thereby becomes the destination anchor document.

In another embodiment, where the user selects a plurality of documents from the list, a link from the parent document to each selected document can be created. In that case, the wiki identifier and the phrase indicated by the wiki identifier within the parent document can be augmented with a plurality of source anchors. A URL corresponding to each selected document can be associated with a corresponding one of the plurality of source anchors.

In illustration, if the phrase indicated by the wiki identifier was "business model" and two documents are selected from the list, a source anchor can be created within the parent document for each selected document. For example, the phrase in the parent document can be augmented as follows: "business model (1, 2)", where the numerical indicators in parenthesis are hyperlinked, but the text "business model" is not hyperlinked. The number "1" can be associated with the URL for the first selected document while the number "2" can be associated with the URL for the second selected document. Any of a variety of different symbols, text, graphics, or numbers can be used as source anchors or in combination with the phrase. As such, the utilization of one particular symbol, graphic, etc. is not intended to limit the present invention. After step 430, the method can repeat as necessary.

Figure 2:
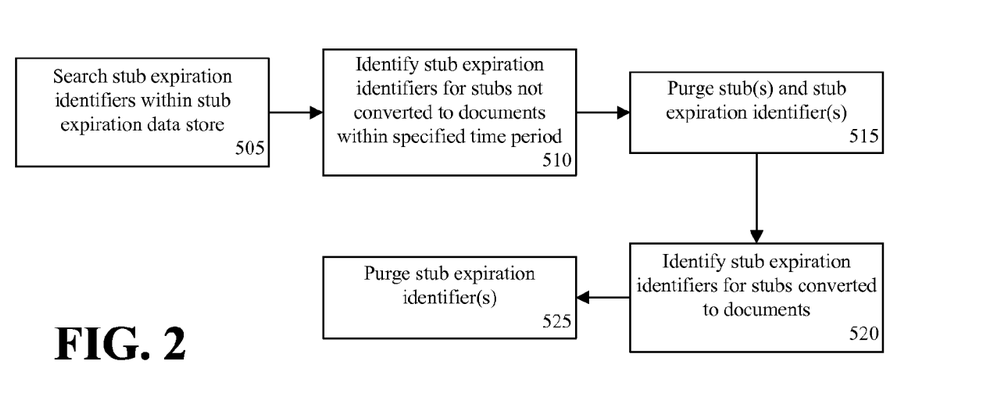
FIG. 2 is a flow chart illustrating a method of monitoring stub activity in accordance with another embodiment of the present invention.

FIG. 2 is a flow chart illustrating a method of monitoring stub activity in accordance with another embodiment of the present invention. The method illustrated in FIG. 2 provides an automated technique for removing unused stubs from the wiki, thereby preventing an inordinate amount of such stubs from cluttering the wiki environment. The method further monitors for stubs that have been converted to documents, i.e. stubs that have received user-contributed content, and purges references to those stubs from the stub expiration data store. It should be appreciated that the method illustrated with reference to FIG. 2 can be performed in combination with the method illustrated with reference to FIGS. 1A-1D, periodically, from time to time, or responsive to selected system events, as the case may be.

In step 505, the wiki content creation system can search the stub expiration data store. In step 510, stub expiration identifiers that have not been converted into documents within a predetermined time period can be identified. The search can locate stub expiration identifiers having a time stamp indicating that the stub has been in existence for longer than the predetermined time period, but has not yet received user-contributed content, i.e. has not been converted into a document. As noted, each stub expiration identifier can specify the URL of the stub that the stub expiration identifier represents. Accordingly, in step 515, any stubs corresponding to stub expiration identifiers identified in step 510 can be deleted. The stub expiration identifier(s) then can be purged from the stub expiration identifier data store.

In step 520, any stub expiration identifiers corresponding to stubs that have been converted into documents can be identified. Since these stubs have been converted to documents, the stub expiration identifier for such stubs no longer needs to be tracked. Accordingly, in step 525, the stub expiration identifier(s) identified in step 520 can be purged or deleted from the stub expiration data store. The method can repeat as may be required.

The embodiments disclosed herein provide a wiki-type content creation system which can be used in a secure processing environment. In accordance with the inventive arrangements disclosed herein, features such as document level security, access control inheritance, selection of stub type, and stub creation monitoring are provided which facilitate the use of the wiki content creation system within environments in which users are given varied levels of access to information stored within the wiki.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising, i.e. open language. The term "coupled", as used herein, is defined as connected, although not necessarily directly, and not necessarily mechanically, i.e. communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of creating content within a multi-user, collaborative, and secure wiki, comprising:
    detecting, by a computer system, a wiki identifier within an author created parent document
    wherein the wiki identifier indicates a phrase;
    wherein the created parent document being associated with an author attribute identifying rights and privileges of a user that created the wiki identifier within the parent document;
    determining, by the computer system, access rights of the user according to the author attribute;
    searching, by the computer system, for documents of the wiki accessible by the user according to the access rights indicated by the author attribute and that have a name corresponding to the phrase indicated by the wiki identifier;
    determining, by the computer system, that at least one document has been identified;
    based on a determination that at least one document has been identifier, creating a source anchor within the parent document and associating a universal resource locator of the identified document with the source anchor.

2. The method of claim 1, responsive to the searching not identifying a document, the method further comprising:
    creating a stub that is devoid of user-contributed content having a name determined from the phrase indicated by the wiki identifier;
    associating the stub with an access control list;
    creating a source anchor within the parent document; and
    associating a universal resource locator for the stub with the source anchor.

3. The method of claim 2, further comprising receiving a user input selecting a stub type from a plurality of stub types, with each stub type corresponding to a different data schema, and creating the stub according to the selected stub type.

4. The method of claim 2, further comprising creating the stub within a user specified location.

5. The method of claim 2, wherein associating the stub with an access control list further comprises associating the stub with an access control list derived from the parent document.

6. The method of claim 2, wherein associating the stub with an access control list further comprises associating the stub with a user specified access control list.

7. The method of claim 2, further comprising, responsive to the stub not being converted into a document comprising user-contributed content within a specified period of time, removing the source anchor from the parent document and deleting the stub.

8. The method of claim 2, further comprising, responsive to the stub not being converted into a document comprising user-contributed content within a predetermined time period, sending a notice to the author of the parent document.

9. The method of claim 1, wherein the searching identifies a plurality of documents, wherein creating a source anchor further comprises:
    presenting a list specifying the plurality of documents; and
    responsive to a user selection of at least one of the plurality of documents from the list, creating a source anchor within the parent document for each user selected document and associating a universal resource locator for each user selected document with a respective one of the source anchors.

10. The method of claim 1, the method further comprising:
    receiving a user input rejecting the at least one identified document;
    creating a stub that is devoid of user-contributed content;
    determining the name of the stub from the phrase associated with the wiki identifier;
    associating the stub with an access control list;
    creating a source anchor within the parent document; and
    associating a universal resource locator for the stub with the created source anchor.

11. A computer-readable hardware having stored thereon a computer program having a plurality of code sections that, when executed by a computer system, cause the computer system to perform the steps of:
    detecting a wiki identifier within an author created parent document
    wherein the wiki identifier indicates a phrase;
    wherein the created parent document being associated with an author attribute identifying rights and privileges of a user that created the wiki identifier within the parent document;
    determining access rights of the user according to the author attribute;
    searching for documents of the wiki accessible by the user according to the access rights indicated by the author attribute and that have a name corresponding to the phrase indicated by the wiki identifier;
    determining that at least one document has been identified;
    based on a determination that at least one document has been identifier, creating a source anchor within the parent document and associating a universal resource locator of the identified document with the source anchor.

12. The computer-readable hardware of claim 11, wherein upon not identifying a document, the computer system is caused to performing the steps of:
   creating a stub that is devoid of user-contributed content having a name determined from the phrase indicated by the wiki identifier;
   associating the stub with an access control list;
   creating a source anchor within the parent document; and
   associating a universal resource locator for the stub with the source anchor.

13. The computer-readable hardware of claim 12, further comprising the steps of:
   determining that the stub was not converted into a document comprising user-contributed content within a specified period of time;
   based on the determination that the stub was not converted into a document comprising user-contributed content within a specified period of time, removing the source anchor from the parent document and deleting a stub expiration identifier.

14. The computer-readable hardware of claim 12, further comprising the steps of:
   receiving a user input selecting a stub type from a plurality of stub types, with each stub type corresponding to a different data schema, and
   creating the stub according to the selected stub type.

15. The computer-readable hardware of claim 12, further comprising the steps of:
   determining that the stub not being converted into a document comprising user-contributed content within a predetermined time period;
   based on the determination that the stub not being converted into a document comprising user-contributed content within a predetermined time period, sending a notice to the author of the parent document.

16. The computer-readable hardware of claim 11, further comprising the steps of:
   identifying the parent document locates a plurality of documents;
   presenting a list specifying the plurality of located documents;
   determining that a user selection of at least one of the plurality of located documents from the list;
   based on the determination that a user selection of at least one of the plurality of located documents from the list, creating a source anchor within the parent document for each user selected document; and
   associating the a universal resource locator for each user selected document with a respective one of the source anchors.

17. The computer-readable hardware of claim 11, further comprising the steps of:
   receiving a user input rejecting the at least one identified document
   creating a stub that is devoid of user-contributed content having a name determined from the phrase indicated by the wiki identifier;
   associating the stub with an access control list; and
   creating a source anchor within the parent document; and
   associating a universal resource locator for the stub with the source anchor.

* * * * *